METHOD OF TREATING SEMICONDUCTOR DEVICE BY IONIC BOMBARDMENT

Filed Oct. 26, 1964

INVENTORS
JAMES O. McCALDIN
BY ALOIS E. WIDMER

A. Fredrick Lamann

ATTORNEY 3,328,210
METHOD OF TREATING SEMICONDUCTOR DEVICE BY IONIC BOMBARDMENT

James O. McCaldin, Los Angeles, and Alois E. Widmer, Canoga Park, Calif., assignors to North American Aviation, Inc.

Filed Oct. 26, 1964, Ser. No. 406,449
9 Claims. (Cl. 148—1.5)

The present invention is directed to a process for treating insulation components of semiconductor devices and to devices fabricated with said process.

One aspect of the present invention relates to the treatment of insulation surface layers on a body of semiconducting material to control or alter the properties of the layer as well as the material adjacent to such a treated layer, which treatment results in the distribution of a permanently induced space charge in the treated layer.

In accordance with the broad aspects of the present invention an insulating surface layer on a semiconductor body is bombarded with ions of a predetermined space charge inducing type, thereby creating a permanent unneutralized charge in the surface layer and a corresponding charge of opposite polarity in the semiconductor body adjacent the insulating surface. The insulation layer is bombarded for a time sufficient to provide a concentration of space charge inducing ions sufficient to control or alter the conductivity characteristics of the volume of underlying semiconductor immediately adjacent to the insulating layer.

A particularly preferred feature of the present invention giving superior results is the bombardment of the heated silicon oxide surface of a semiconductor by donor type alkali metal ions selected from the group consisting of sodium, potassium, rubidium and cesium. The ions implanted in the oxide coating give rise to no change in the conductivity characteristic of the oxide insulation but their presence is evidenced rather by charge effects associated with the implanted ions which are reflected by changes in the conductivity characteristics of the underlying material, e.g., silicon.

In the present invention space charge inducing ions are divided into two categories, i.e., ions of electropositive elements and ions of electronegative elements, which are ionizable in apparatus operable at reasonable temperatures, i.e., less than about 300° C. for Penning type ion sources. However, for other source types, e.g., contact ionizers, appropriately higher temperatures may be used. Examples of the electropositive elements are alkaline earth metals, such as barium and strontium, and the alkali metal ions enumerated above, while examples of the electronegative elements are the halogens, such as iodine, bromine, chlorine and fluorine.

The insulating layer, while preferably the oxide of a semiconductor material such as silicon or germanium, may be any insulation over or adjacent to a material, semiconductor or metal, the electrical characteristics of which it is desired to alter or control.

In accordance with the principal object of the present invention controlled or altered electrical characteristics of a material underlying an insulator may be affected by bombarding the insulator with ions of the space charge inducing type.

Another object of the present invention is to provide a method for selectively altering the electrical characteristics of a portion of substrate material adjacent to a surface insulator.

A further object of the present invention is to provide a method for treating the surface insulation layer only to affect a change in the electrical characteristics of an underlying semiconductor body.

These and other objects of the present invention will become more apparent from the following detailed description of various embodiments of the present invention taken together with the drawings, hereby made a part thereof, in which.

Figure 1:
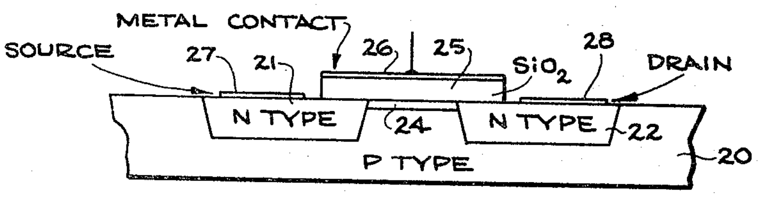
FIG. 1 is a sectional representation of a device utilizing the method and composition of the present invention.

The present invention will be described with respect to an insulated gate field effect transistor structure, the characteristics and operation of which are well-known (see "The Field Effect Transistor—A Review," J. T. Wallmark, R.C.A. Review 24: 641 (1963)) and which are schematically shown in FIG. 1. Referring now to FIG. 1, a transistor structure which may be fabricated in accordance with the method of the present invention is illustrated. The structure comprises a p-type semiconductor 20, e.g. (silicon, with a pair of spaced regions 21 and 22 having a conductivity type different than the bulk of semiconductor 20. The spaced regions 21 and 22 may be formed by standard diffusion techniques well-known in the art or by ion bombardment as described in the co-pending application of James O. McCaldin, entitled "Method of Treating Semiconductor Bodies," Ser. No. 308,617, filed Sept. 9, 1963, now Pat. No. 3,293,084, the disclosure of which is incorporated herein by reference. The spaced regions 21 and 22 are separated by a channel 24 of semiconductor material 20 having a length, i.e., the distance between the adjacent regions 21 and 22, which may be of any desired magnitude.

A dielectric coating 25, e.g., $SiO_2$ of the order of a hundred or thousand angstroms thick, is grown or deposited by standard techniques over the channel 24 and portions of the adjacent regions 21 and 22. Appropriate thin metallic contacts 26, 27 and 28 are provided to the dielectric coating and each area 21 and 22, respectively.

Figure 2:
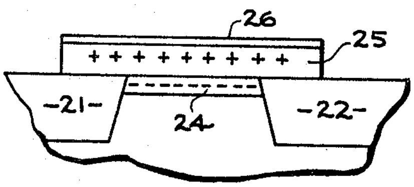
FIG. 2 is a pictorial representation of a portion of FIG. 1 showing the space charge generated by the method of the present invention.

The present invention is directed to a method and resulting product in which the space charge is controlled to an initial predetermined extent by generating a permanently induced spaced charge in the channel 24 of semiconductor 20. This is accomplished by implanting in the dielectric layer 25 ions which induce a space charge in the underlying semiconductor. This arrangement is illustrated in FIG. 2. The dielectric layer 25 contains, as described hereinafter, implanted ions indicated in FIG. 2 as plus symbols. These ions, when implanted in a thin film of dielectric 25 such as silicon oxide, do not generally become neutralized. Instead their presence in the dielectric 25 induces a space charge (—) in the channel 24 of the underlying semiconductor crystal 20. In this manner a permanent n-type space charge is induced thereby facilitating electron flow between areas 21 and 22. As a result a larger biasing voltage would be required to prevent electron flow. The opposite result may be attained by implanting negative ions in the dielectric 25 and thereby inducing a permanent positive space charge in the channel 24. In such an arrangement a permanent built-in biasing effect is produced which would prevent electron flow unless an appropriately large driving signal was applied.

The process for obtaining the above described device is exemplified by the following steps. A silicon crystal having an initial uniform p-type resistivity of about 0.1 ohm-cm. and boron concentration of about $4\times10^{17}$ cm.$^{-3}$ was exposed to an oxidation atmosphere of steam, at about 1200° C. for three hours, to produce an oxide layer having a thickness of about 12,000 A. Appropriate windows or openings are made in the oxide using conventional photoresist techniques followed by phosphorous deposition at 1200° C. using a conventional carrier gas system. The phosphorous glass formed is removed by a 25 sec. etching step using an etch consisting of 15 parts HF, 10 parts $HNO_3$ and 300 parts water. The phosphorous is then diffused deeper into the silicon crystal by heating at about 1200° C. for 12½ hours. The oxide is then completely removed.

The surface of crystal 20 is then completely reoxidized by exposure to dry oxygen at about 1200° C. for three hours to grow a new oxide layer of about 4000 A. thickness on the entire crystal surface. This oxide is then bombarded with cesium ions of 10 kev. energy for 20 minutes with a beam of about 3 ma. while maintaining the specimen at from 200 to about 500° C., preferably about 500° C.

Standard photoresist techniques are then utilized to selectively remove portions of the bombarded silicon oxide so that adjacent areas 21 and 22, spaced about five mils apart in this example, are connected with an overlapping oxide layer 25 in which cesium ions have been injected. A metal contact 26 is then deposited on the surface of oxide layer 25 and appropriate electrical connections made with the source and drain.

This process was followed in the following examples for the specific conditions outlined.

*Example I*

A single crystal silicon sample with 110 orientation having a p-type bulk dopant concentration of about $4\times10^{17}$ cm.$^{-3}$ boron was treated by the above described method until completion of the reoxidizing steps. The specimen was heated to and maintained at about 500° C. and bombarded with cesium ions of 10 kev. energy for 20 minutes. The ion beam current average was about 2.9 ma. Standard photoresist techniques were utilized to selectively remove portions of the oxide so that over the channel 24 the bombarded oxide remained as shown in FIG. 2. In this manner a field effect transistor structure consisting of two spaced n-type regions 21 and 22 separated by a p-type region having a channel length of about 5 mils was fabricated. The bombarded oxide coating also covered adjacent portions of the n-type regions. Electrical contacts were applied to the n-type regions, by methods well-known in the art, and an aluminum metal gate contact was applied by standard procedures to the oxide surface between the two n-type regions.

*Example II*

The procedure of Example I was repeated for a specimen having an initial p-type bulk dopant concentration of about $4\times10^{17}$ cm.$^{-3}$, except that the reoxidizing step was performed for two hours at 1197° C. to obtain an oxide coating 2700 A. thick. The oxide surface was bombarded with cesium ions while the specimen was maintained at 463° C. The ion energy was 10 kev., the bombardment time 30 minutes and the average beam current about 1.7 ma. The remaining steps were the same as Example I.

*Example III*

The procedure of Example I was repeated for a specimen having the same characteristics except that the oxide thickness after the reoxidizing step was 900 A. thick, and the bombarding time with cesium was 25 minutes with an average beam current of about 2 ma.

*Example IV*

The procedure of Example I was repeated for a specimen having the same characteristics except that the channel length was 10 mils, the oxide thickness after the reoxidizing step was about 1000 A., and sodium ion bombardment was used. The specimen was maintained at 400°

C. while the surface was bombarded with 9 kev. sodium ions for 10 minutes where the average beam current was about $4\times10^{-7}$ amps.

Figure 3:
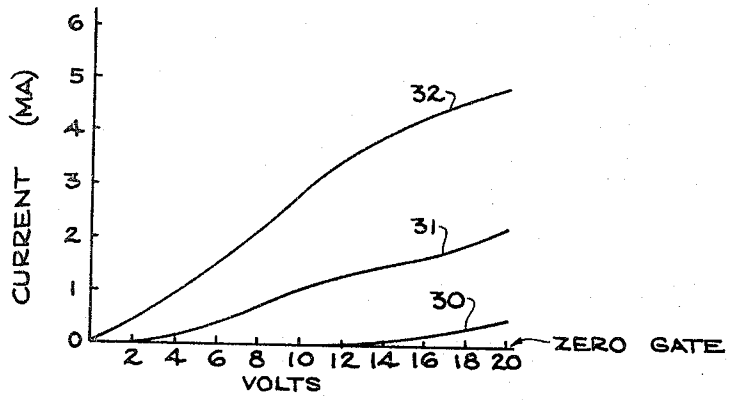
FIG. 3 is a graph showing the characteristic of an unbombarded field effect transistor.

Each specimen described in the above examples of the process of the present invention had electrical characteristics significantly different than those of the same structure but without ion injection. Thus, a sample was prepared by the above procedures except that no ion bombardment of the oxide was undertaken. The electrical characteristics of such a device are shown in FIG. 3. The voltage-current relationship shown is between the source and drain while the curves 30, 31 and 32 show the change from zero gate voltage for applied gate voltages of +22.5, +45 and +67.5 volts, respectively. It is clear that for zero gate voltage there is no conductance for the range of 0 to 20 volts.

Figures 4, 5:
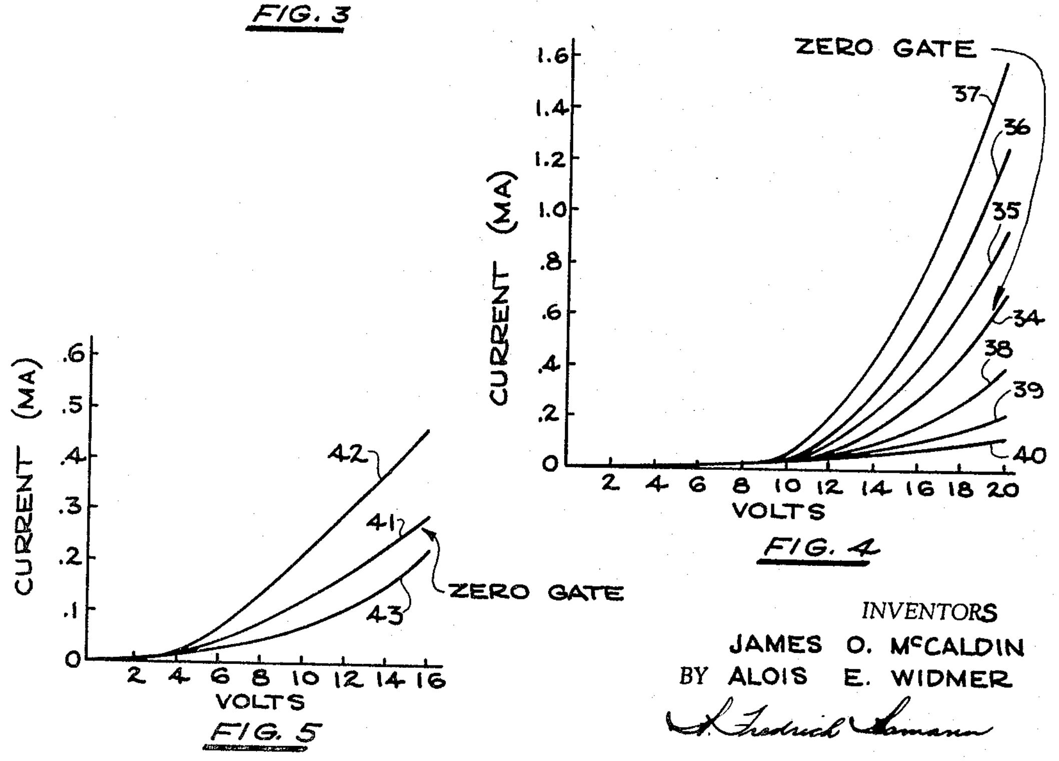
FIGS. 4 and 5 are graphs showing the characteristics of field effect transistor structures fabricated in accordance with the present invention.

The structures made in accordance with the process of the present invention, however, show significantly changed voltage-current-gate voltage relationship. For example, FIG. 4 shows the characteristics of the device described in Example II above. It is apparent from FIG. 4 that with zero gate voltage, curve 34, that significant conductance is present at voltage values greater than about 10 volts. The effect of various positive and negative gate voltage is also shown. Thus, curves 35, 36 and 37 show the increased conductance resulting from applied gate positive polarity voltages of 5, 10 and 15 volts, respectively. Curves 38, 39 and 40 show the decreased conductance resulting from applied gate negative polarity voltage of 5, 10 and 15 volts, respectively. A comparison of FIGS. 3 and 4 establishes that the introduction of cesium ions into the oxide layer of a field effect transistor can permanently increase channel conductance.

FIG. 5 shows the characteristics of the device described in Example IV above. It is apparent from FIG. 5 that sodium ions introduced into the oxide layer also materially change the electrical characteristics. Thus, curve 41, 42 and 43 are for zero gate voltage, positive 50 volts, and negative 50 volts, respectively. It is also apparent from the above that the effect on the electrical characteristics of the underlying semiconductor is a function of the bombardment time, beam current, oxide thickness and channel length, since the device of FIG. 5 (Example IV) had twice the initial channel length, a significantly reduced bombardment time and beam current, but a reduced oxide thickness. However, since none of these parameters are critical to device operability, selective variations may be made to obtain the desired characteristics. As is well-known, however, sodium is more mobile in $SiO_2$ type materials than larger ions like cesium. Therefore, diffusion of the sodium is more likely with consequent modification of the electrical characteristics.

While the above examples are described with respect to silicon, other semiconductor material may be utilized as is well-known in the art. Further, either negative or positive ions may be introduced in the semiconductor material which may be of any preselected conductivity type. In addition, the insulating surface layer need not be an oxide nor an oxide of the underlying semiconductor since other insulating oxides (including metal oxides), ceramics and glasses or other dielectrics may be used.

The process of the present invention has been described as particularly adapted for use in modifying the electrical characteristics of a field effect transistor. However, other applications include hot electron devices employing an oxide layer as an insulator between two other layers, e.g., a pair of metal layers or metal layer and a vacuum layer, in a sandwich construction. In such a device the electrostatic potential across the sandwich is an important parameter which may be controlled and modified by introducing charges by the process of the present invention.

Although particular embodiments of the present invention have been described herein, various modifications may be made without departing from the spirit and scope of the invention.

We claim:

1. A method of permanently inducing a change in the electrical characteristics of a portion of a semiconductor having a portion thereby covered by a dielectric layer comprising the steps of introducing only into said dielectric layer at least one space charge inducing ion, said space charge inducing ion being selected from the class consisting of Na, K, Rb, Cs, F, Cl, Br and I, the number of ions introduced being of such quantity to induce a space charge in at least a portion of said semiconductor subjacent said dielectric layer of a magnitude adequate to produce a change in the electrical conductivity of said portion.

2. A method of permanently inducing a change in the electrical characteristics of a portion of a semiconductor having a portion thereof covered by a dielectric layer comprising the steps of introducing only into said dielectric layer ions of at least one space charge inducing material seletced from the class consisting of Na, K, Rb and Cs, the number of ions introduced being of such quantity to induce a space charge in at least a portion of said semiconductor subjacent said dielectric layer of a magnitude adequate to produce a change in the electrical conductivity of said portion.

3. The method of claim 2 wherein said space charge inducing ion is Cs.

4. The method of claim 2 wherein said space charge inducing ion is Na.

5. The method of claim 2 wherein said semiconductor is boron doped silicon, said dielectric layer is silicon dioxide, and said ion is Cs.

6. The method of claim 2 wherein at least said dielectric layer is heated and maintained at a temperature of from about 200 to about 500° C. while said ions are introduced.

7. A method of fabricating a field effect transistor comprising the steps of forming in a semiconductor a pair of spaced volumes of one conductivity separated by a volume of a different conductivity, forming a dielectric layer at least over the surface of said different conductivity volume, heating at least said dielectric layer, bombarding said heated dielectric layer adjacent said different conductivity volume with ions of at least one space charge inducing material, said ions being selected from the class consisting of Na, K, Rb and Cs, the number of said ions introduced into said layer being of such quantity to induce a space charge in said separating volume adequate to alter the electrical conductivity of said portion, and forming separate electrical contacts on said spaced volumes and a gate contact on said dielectric layer.

8. The method of claim 7 wherein said at least one ion is Cs.

9. The method of claim 7 wherein said at least one ion in Na.

References Cited

UNITED STATES PATENTS

| | | | |
|---|---|---|---|
| 2,750,541 | 6/1956 | Ohl. | |
| 3,102,230 | 8/1963 | Kahng | 317—234 X |
| 3,226,614 | 12/1965 | Haenichen | 148—33.3 X |

WILLIAM I. BROOKS, *Primary Examiner.*

JOHN F. CAMPBELL, *Examiner.*